United States Patent
Yamashita et al.

(10) Patent No.: US 8,278,781 B2
(45) Date of Patent: Oct. 2, 2012

(54) DISCHARGER AND DISCHARGER CONTROL METHOD

(75) Inventors: Akira Yamashita, Kanagawa (JP);
Takahisa Shodai, Kanagawa (JP);
Akihiro Miyasaka, Kanagawa (JP);
Riichi Kitano, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 740 days.

(21) Appl. No.: 12/439,015

(22) PCT Filed: May 25, 2007

(86) PCT No.: PCT/JP2007/060691
§ 371 (c)(1),
(2), (4) Date: Feb. 26, 2009

(87) PCT Pub. No.: WO2008/044360
PCT Pub. Date: Apr. 17, 2008

(65) Prior Publication Data
US 2010/0013324 A1    Jan. 21, 2010

(30) Foreign Application Priority Data
Oct. 5, 2006    (JP) .................................. 2006-274070

(51) Int. Cl.
*H01H 47/00*    (2006.01)
*H01H 83/00*    (2006.01)
*H02J 7/00*    (2006.01)

(52) U.S. Cl. .......... 307/125; 307/66; 307/140; 320/112; 320/127

(58) Field of Classification Search .................. None
See application file for complete search history.

(56) References Cited

U.S. PATENT DOCUMENTS

| | | | |
|---|---|---|---|
| 5,532,523 A * | 7/1996 | Tang ............................... | 307/64 |
| 5,734,259 A | 3/1998 | Sisson et al. | |
| 5,801,514 A | 9/1998 | Saeki et al. | |
| 6,147,472 A | 11/2000 | Hewes et al. | |
| 6,225,708 B1 * | 5/2001 | Furukawa et al. ............... | 307/66 |
| 6,242,890 B1 * | 6/2001 | Sudo et al. .................... | 320/128 |
| 6,577,104 B2 * | 6/2003 | Sakakibara .................... | 320/132 |
| 7,026,726 B2 * | 4/2006 | Shiojima ........................ | 307/66 |
| 8,022,671 B2 * | 9/2011 | Chueh et al. .................. | 320/127 |
| 2002/0149346 A1 * | 10/2002 | Sakakibara .................... | 320/162 |
| 2004/0095021 A1 * | 5/2004 | Fogleman et al. .............. | 307/52 |

(Continued)

FOREIGN PATENT DOCUMENTS

CN    1482726 A    3/2004
(Continued)

*Primary Examiner* — Rexford Barnie
*Assistant Examiner* — Justen Fauth
(74) *Attorney, Agent, or Firm* — Blakely, Sokoloff, Taylor & Zafman

(57) ABSTRACT

Upon detecting an external signal which instructs to stop discharge, an input voltage equal to or less than a set value for the prevention of overdischarge, or an output voltage equal to or more than a set value for the prevention of output of an overvoltage, a control unit (12) stops discharge to a load (40) by opening a switching element (4b) of a step-down unit (11b). Upon detecting that an external signal is reset or an input voltage equal to or more than a set value larger than the set value for the prevention of overdischarge, the control unit (12) resumes discharge to the load (40) by setting the switching element (4b) in a switching operation state or short-circuiting it.

8 Claims, 3 Drawing Sheets

U.S. PATENT DOCUMENTS

| | | | |
|---|---|---|---|
| 2005/0024905 A1* | 2/2005 | Shiojima | 363/110 |
| 2005/0194937 A1* | 9/2005 | Jacobs | 320/135 |
| 2007/0103114 A1* | 5/2007 | Hoffman | 320/114 |
| 2007/0103116 A1 | 5/2007 | Johnson et al. | |
| 2007/0108941 A1* | 5/2007 | Sainomoto et al. | 320/112 |
| 2007/0262655 A1* | 11/2007 | Lin et al. | 307/140 |
| 2008/0169705 A1* | 7/2008 | Tan et al. | 307/66 |
| 2008/0296975 A1* | 12/2008 | Shakespeare et al. | 307/66 |
| 2010/0026092 A1* | 2/2010 | Iida et al. | 307/18 |
| 2011/0127943 A1* | 6/2011 | Oto | 320/101 |

FOREIGN PATENT DOCUMENTS

| | | | |
|---|---|---|---|
| JP | 08-223909 A | | 8/1996 |
| JP | 200351086 | * | 2/2003 |
| JP | 2004-119112 A | | 4/2004 |
| JP | 2004-120856 A | | 4/2004 |
| JP | 2004-120857 A | | 4/2004 |

* cited by examiner

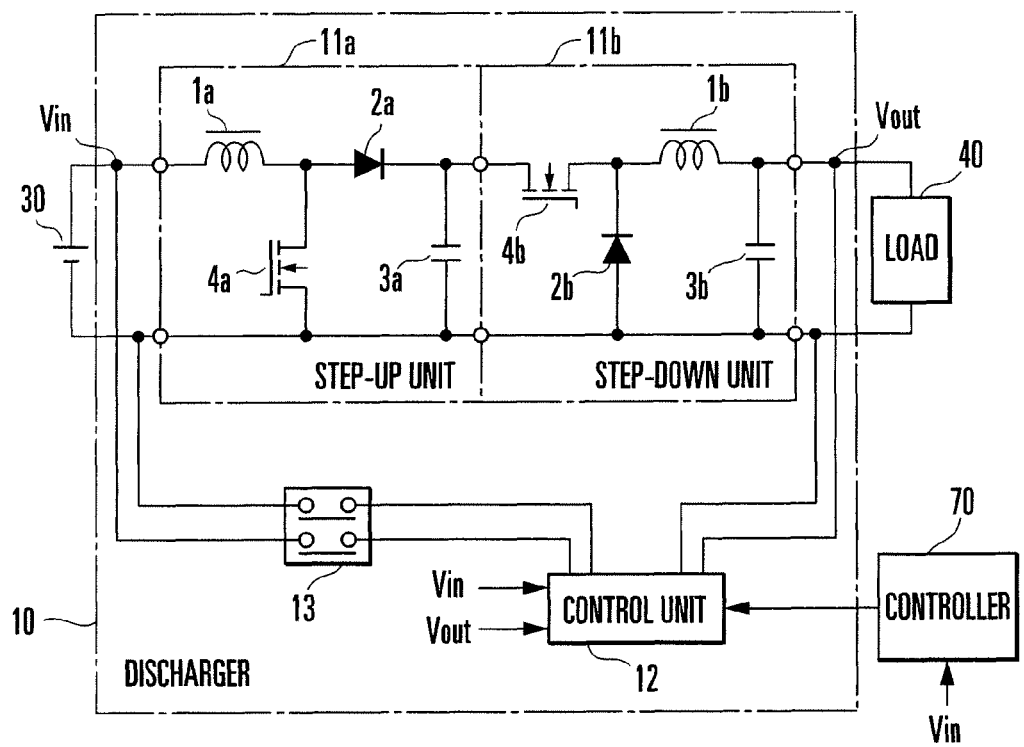
F I G. 1
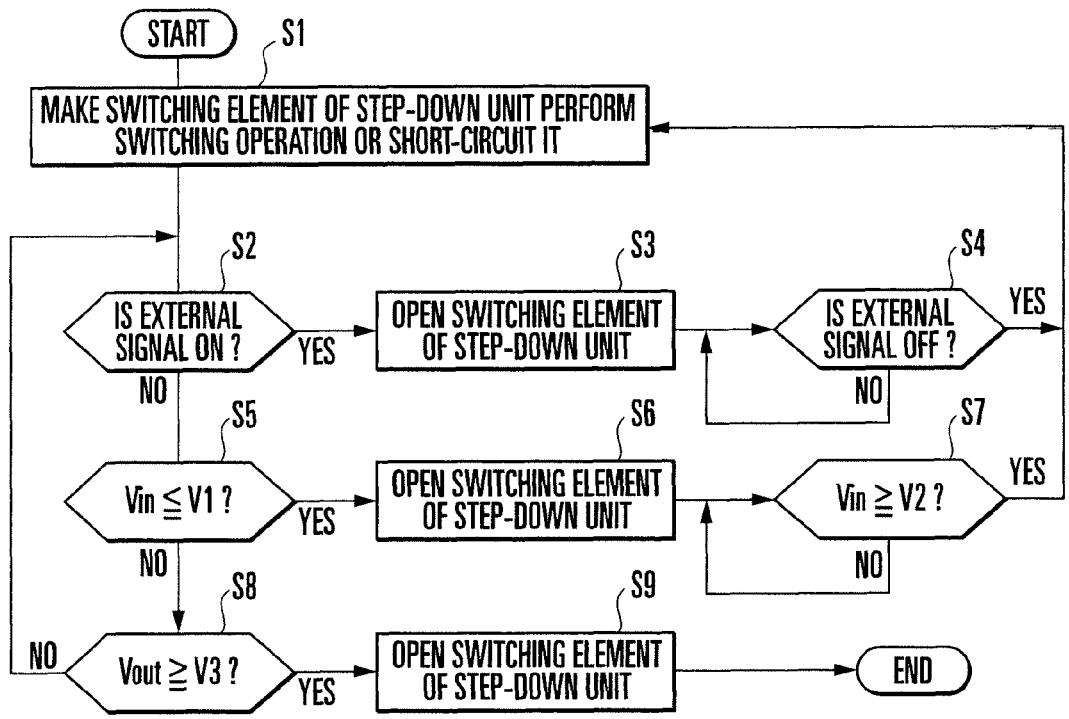
F I G. 2

DISCHARGER AND DISCHARGER CONTROL METHOD

The present patent application is a Utility claiming the benefit of Application No. PCT/JP2007/060691, filed May, 25, 2007.

TECHNICAL FIELD

The present invention relates to a discharger and a discharge control method and, more particularly, to a discharger and discharge control method which control an output from a DC power supply which is supplied to a load when a battery system constituted by a plurality of assembled batteries is used as a DC power supply system.

BACKGROUND ART

Nickel metal hydride batteries used for DC power supplies are characterized in that they have high energy densities and long battery lives and are environment-friendly as compared with lead-acid batteries. In addition, the nickel metal hydride batteries are compact and lightweight and have good portability, and hence have recently and rapidly become widespread as on-vehicle batteries and power supplies for countermeasures against disaster.

In order to cope with a recent abrupt increase in power demand for communication equipment, it is necessary to form a power supply system (battery system) having a large capacity, e.g., an output of 30 kWh, by connecting battery sets such as nickel metal hydride batteries in parallel with each other so as to increase the capacity of a DC power supply. In general, when nickel metal hydride batteries are to be used as a power supply system, in order to increase the capacity and service life of the power supply system, a large-capacity nickel metal hydride battery system is formed by connecting k single nickel metal hydride batteries (with an average voltage of 1.2 V and a current capacity of 95 Ah) called single cells in series with each other to form one unit (to be referred to as a module hereinafter), connecting m modules in series with each other to form an assembled battery, and connecting n assembled batteries in parallel with each other.

Various proposals have been made for mechanisms for managing the supply capacity of power for a load in a large-capacity battery system. For example, Japanese Patent Laid-Open Nos. 2004-119112, 2004-120856, and 2004-120857 disclose management methods in power supply systems each including a plurality of assembled batteries connected in parallel with each other, a charge control means, and a discharge control means.

Japanese Patent Laid-Open No. 2004-119112 discloses a technique of internally storing the manufacturing date of an assembled battery, calculating an available period during which predetermined power can be supplied, on the basis of the stored manufacturing date of the assembled battery, and displaying an assembled battery replacement date, in order to facilitate estimation of the service life of the assembled battery at the time of maintenance inspection.

Japanese Patent Laid-Open No. 2004-120856 discloses a technique of providing a battery monitoring means for executing a discharge capacity test on a given assembled battery as a deterioration determination target upon fully charging assembled batteries other than the deterioration determination target as well as the target assembled battery in order to allow power supply to the load side even if a power failure or the like occurs during the execution of the discharge capacity test for deterioration determination of the assembled battery.

In addition, Japanese Patent Laid-Open No. 2004-120857 discloses a technique of providing, for the purpose of reducing a power cost by leveling power demands, a battery monitoring means for monitoring whether the residual capacity of an assembled battery has become equal to or less than a charge start threshold, and if the residual capacity has become equal to or less than the charge start threshold, starting auxiliary charging of the assembled battery at a predetermined time late at night when power is used relatively less.

DISCLOSURE OF INVENTION

Problem to be Solved by the Invention

As described above, when a battery system with an output of 30 kWh is to be implemented by using, for example, nickel metal hydride batteries, 10 nickel metal hydride battery cells with a rated voltage of 1.2 V (an average voltage of 1.2 V and a current capacity of 95 Ah) are connected in series to form one module, and four modules are connected in series to form one system of assembled batteries (output of 5 kWh). In addition, as shown in FIG. 3, six systems of assembled batteries are connected in parallel with each other. FIG. 3 is a view showing the arrangement of a battery system formed by using a plurality of assembled batteries and a plurality of dischargers. FIG. 3 also shows chargers for charging the assembled batteries.

That is, in the arrangement example shown in FIG. 3, six systems of assembled batteries 30-1, 30-2, 30-3, 30-4, 30-5, and 30-6 are connected in parallel with each other to form a battery system using a plurality of assembled batteries. This system further includes dischargers 10 for stepping up/stepping down the battery voltages respectively output from the six systems of assembled batteries so as to make the voltages fall within the allowable voltage range of a load 40, chargers 20 for intermittently charging a plurality of assembled batteries 30 from a rectifier 50, and a power supply control unit 60 which controls the overall operation of the battery system including the dischargers 10 and the chargers 20. In the case shown in FIG. 3, a discharger 10-1 and a charger 20-1 are provided for the assembled batteries 30-1 and 30-2, a discharger 10-2 and a charger 20-2 are provided for the assembled batteries 30-3 and 30-4, and a discharger 10-3 and a charger 20-3 are provided for the assembled batteries 30-5 and 30-6.

In the battery system in FIG. 3, the assembled batteries 30, i.e., 30-1, 30-2, 30-3, 30-4, 30-5, and 30-6, are charged by outputs from the rectifier 50 via the corresponding chargers 20, i.e., 20-1, 20-2, and 20-3, and power is supplied to the load 40 via the respective dischargers 10, i.e., 10-1, 10-2, and 10-3 in accordance with control operation by the power supply control unit 60. In this case, the plurality of dischargers 10 are electrically connected on the output side and connected to the load 40. The plurality of chargers 20 are electrically connected on the input side and connected to the rectifier 50. Additionally installing dischargers 10, chargers 20, and assembled batteries 30 can extend the battery system. For example, connecting three 30-kWh battery systems, each shown in FIG. 3, in parallel with each other can implement a battery system in the 100 kWh class.

The dischargers 10-1, 10-2, and 10-3 perform step-down operation (step-down mode) by using DC-DC converters if the battery voltages respectively output from the corresponding assembled batteries 30-1, 30-2, 30-3, 30-4, 30-5, and 30-6 exceed the allowable voltage range of the load 40. If the battery voltages fall within the allowable voltage range of the load 40 and the operating voltage range, the dischargers bypass (bypass mode) the battery outputs without via the DC-DC converters. If the battery voltages fall below the operating voltage range of the load 40, the dischargers perform step-up operation (step-up mode) using the DC-DC converters.

That is, the dischargers 10-1, 10-2, and 10-3 mounted in the 30-kWh battery system shown in FIG. 3 each include a step-up unit 11a and a step-down unit 11b, as shown in FIG. 4. FIG. 4 is a circuit diagram showing an example of the circuit arrangement of a step-up/step-down DC-DC converter which is mounted in a discharger, and shows an example of the circuit arrangement of the step-up unit 11a and step-down unit 11b which constitute the step-up/step-down DC-DC converter. As indicated by a discharger 10A in FIG. 4, the step-up unit 11a and the step-down unit 11b each include circuit constituent elements. The step-up unit 11a includes a reactor 1a, a diode 2a, a capacitor 3a, and a switching element 4a. The step-down unit 11b includes a reactor 1b, a diode 2b, a capacitor 3b, and a switching element 4b.

The step-up unit 11a controls the switching element 4a to perform step-up operation if the voltage applied from the assembled battery 30 to the load 40 falls below the operating voltage range of the load 40. The step-down unit 11b controls the switching element 4b to perform step-down operation if the voltage applied from the assembled battery 30 to the load 40 exceeds the allowable voltage range of the load 40.

In the arrangement of the discharger 10A like that shown in FIG. 4, even after discharge operation continues and the voltage of the assembled battery 30 decreases to reach an overdischarge voltage, since the discharge operation continues, resulting in accelerating the deterioration of the battery. In addition, if an excessive voltage is output from the discharger 10A and exceeds the allowable voltage range of the load 40 due to a failure or the like in the discharger 10A, load equipment fails. Furthermore, even if there is a need to stop discharge from the discharger 10A due to some reason, there is no means for externally stopping discharge operation to the load 40 side.

As a method of solving the above problems in the discharger 10A in FIG. 4, a method of adding a disconnection unit which stops discharge operation to the discharger 10A is available. FIG. 5 is a circuit diagram showing an example of a circuit arrangement in which a disconnection unit is added to the step-up/step-down DC-DC converter mounted in a discharger, and shows a case in which a disconnection unit 11c for stopping discharge operation is added to the step-up unit 11a and the step-down unit 11b.

Although the circuit arrangement of a step-up unit 11a and step-down unit 11b in a discharger 10B in FIG. 5 is totally the same as that in the discharger 10A in FIG. 4 except that a disconnection unit 11c is further connected to the step-up unit 11a side. The disconnection unit 11c is constituted by a diode 2c and a disconnection switch 4c. Controlling the disconnection switch 4c of the disconnection unit 11c can continue or stop discharge operation to the load 40 side of the discharger 10B.

In the case of the discharger 10B in FIG. 5, the following problem remains unsolved. The function of the disconnection unit 11c needs to include a recovery function which restores discharge operation to the load 40 side when restoration conditions for restoration from a disconnected state hold, in addition to all the functions like those described above, including an overdischarge prevention function, an overvoltage prevention function, and a function for disconnection from outside in accordance with an external signal.

In addition, the discharger 10B generally has the following characteristic. Assume that the discharger detects the occurrence of overdischarge by using a threshold set in advance as a voltage value for the prevention of overdischarge and causes the disconnection unit 11c to operate to perform disconnection so as to stop power supply to the load 40. In this case, after the disconnection, the battery voltage of the assembled battery 30 is naturally restored. For this reason, if the above threshold is used as a condition for restoration from disconnection, and whether to make the disconnection unit 11c operate or to perform restoration is determined on the basis of only the threshold, the discharger repeatedly performs disconnection and restoration, resulting in a state in which the function for protecting the battery against overdischarge fails to work.

The following problem also arises in the arrangement of the discharger 10B. The disconnection unit 11c is series-connected to the step-up unit 11a and the step-down unit 11b in the form of additional insertion, and the respective circuits include circuit elements which cause voltage drops, such as the diodes 2a and 2c and the disconnection switch 4c. For this reason, even if the discharger 10B is made to operate in the bypass mode, a voltage difference occurs between the input and output of the discharger 10B, and the output performance of the battery system deteriorates.

In the arrangement of the discharger 10B, voltage drops caused by the diodes 2, i.e., 2a, 2b, and 2c, in the step-up unit 11a, the step-down unit 11b, and disconnection unit 11c increase the power loss, and also increase the amount of heat generated by the discharger 10B. As a result, part of the dischargeable energy stored in the assembled batteries 30 becomes a loss. This shortens the time during which power can be supplied from the battery system to the load 40, and makes it necessary to install more assembled batteries 30 (storage batteries). Furthermore, with an increase in the amount of heat generated, it is necessary to increase the size of the discharger 10B and additionally install air conditioning equipment. This also increases the installation space for a battery system forming a power supply system and the cost necessary for construction.

The disconnection unit 11c needs to consume power to maintain the circuit disconnected state of the discharger 10B after disconnecting operation. Assume that a battery system is constituted by a plurality of dischargers 10B. In this case, even after all the dischargers 10B mounted in the battery system are disconnected, it is necessary to maintain the disconnected state of each discharger 10B. For this reason, the dischargers 10B, which are set at zero voltage in the disconnected state, cannot supply power from the output side to the corresponding disconnection units 11c. It is necessary to supply power from the assembled batteries 30 on the input side of the dischargers 10B. Therefore, the assembled battery 30 always continues power supply operation for the disconnection unit 11c in any state regardless of whether power is being supplied from a commercial power supply. This increases the speed of reduction in the capacity of the assembled battery 30 and the charge/discharge cycle, resulting in a decrease in the service life of the assembled battery 30.

Note that the above problems in the discharger 10A in FIG. 4 and the discharger 10B in FIG. 5 are not limited to a battery system which includes a plurality of assembled batteries each constituted by a combination of a plurality of nickel metal hydride batteries and supplies power output from the assembled batteries to a load via corresponding step-up/step-down DC-DC converters, respectively. That is, these problems include an early deterioration in the assembled batteries 30 due to the continuation of discharge, erroneous output of an overvoltage to the load 40, the problem that no external disconnection means for the discharger 10A is available, the problem concerning operation conditions for disconnection by the disconnection unit 11c and conditions for restoration from disconnection, the problem concerning increases in installation space and the cost required for the construction of a battery system with an increase in voltage drop due to the insertion of the diodes 2, i.e., 2a and 2c, and the disconnection switch 4c, and the problem that supplying power from the assembled battery 30 to the disconnection unit 11c will shorten the service life of the assembled battery 30.

For example, such problems also rise in a secondary battery system which has a plurality of assembled batteries each constituted by a combination of secondary batteries other than nickel metal hydride batteries, e.g., lithium ion batteries and supply power output from the assembled batteries to a load via corresponding step-up/step-down DC-DC converters, a battery system which supplies power output from a plurality of assembled batteries each constituted by a plurality of batteries including primary batteries to a load via corresponding step-up/step-down DC-DC converters, and a power supply system which supplies power output from a plurality of power supplies each constituted by a plurality of DC power supplies including power storage capacitors to a load via corresponding step-up/step-down DC-DC converters.

The present invention has been made in consideration of the above problems, i.e., an early deterioration in assembled batteries due to the continuation of discharge, erroneous output of an overvoltage to a load, the problem that no external discharge disconnection means is available, the problem concerning operation conditions for a disconnection unit for disconnecting a discharger from a load and conditions for restoration from disconnection, the problem concerning increases in installation space and the cost required for the construction of a battery system with an increase in voltage drop due to the insertion of diodes for disconnection, and the problem that always supplying power from an assembled battery to the disconnection unit will shorten the service life of the assembled battery.

That is, it is an object of the present invention to provide a discharger and discharge control method which can prevent overdischarge of a battery as a DC power supply, protect load equipment against an overvoltage, perform external disconnection, properly execute disconnection of discharge operation from a load and restoration from disconnection in accordance with predetermined conditions, reduce a voltage drop in the discharger, and prolong a battery life by eliminating the necessity to always supply power from the battery to the discharger.

Means of Solution to the Problem

A discharger of the present invention comprises step-down means including at least a switching element provided between a DC power supply and an output to a load, and control means for controlling an output voltage to the load by controlling the switching element, and if a predetermined condition holds, stopping power output to the load by setting the switching element in an open state.

A discharge control method of the present invention comprises the discharging step of controlling an output voltage to a load by controlling a switching element in step-down means including at least the switching element provided between a DC power supply and an output to the load, and the opening step of stopping power output to the load by setting the switching element in an open state when a predetermined condition holds.

Effects of the Invention

As described above, according to the present invention, discharge operation to the load can be stopped by providing the discharger with the control means for setting the switching element in an open state when a predetermined condition holds. In the present invention, since the switching element of the step-down means is used not only as a constituent element of a step-down DC-DC converter but also as an element which implements a discharge disconnection function for stopping discharge to the load, there is no need to newly provide a dedicated disconnection unit as a discharger as in the prior art, and a power loss can be reduced. This can reduce the amount of heat generated. As a consequence, the present invention can efficiently discharge power stored in the battery to the load and suppress the space and cost required to construct a battery system which forms a power supply system.

The present invention can also stop discharge operation to a load by externally issuing an instruction to stop power output to a load, as needed. If, for example, an overdischarge state of the battery or a failure in the discharger is detected, power supply to the load can be stopped by inputting, to the discharger, an external signal which instructs to stop discharge operation. This can prevent overdischarge of the battery and prevent the danger of applying an overvoltage to the load due to a failure or the like in the discharger.

According to the present invention, when the discharge operation stop state is released, the discharge operation of the discharger can be easily resumed by resetting the external signal input from outside.

The present invention can stop discharge operation to a load when detecting that an input voltage from a DC power supply becomes equal to or less than a predetermined first set value. As a consequence, the present invention can automatically prevent the overdischarge of a battery.

According to the present invention, when it is detected that an input voltage from a DC power supply has become equal to or more than a second set value larger than the first set value after the input voltage from the DC power supply has become equal to or less than the first set value and the switching element has been set in an open state, restoration to discharge operation can be properly performed by setting the switching element in either a switching operation state or a short-circuited state.

The present invention can stop discharge operation to a load when detecting that an output voltage to the load has become equal to or more than the first set value. As a consequence, the present invention can automatically stop discharge operation to a load even when an abnormally high voltage appears in an output from the discharger due to a failure or the like in the discharger. This can prevent a situation in which an overvoltage is applied to the load and contribute to the protection of load equipment.

In addition, according to the present invention, since power to the control means is supplied from the output side of the discharger instead of the battery in a normal state, unnecessary consumption of the battery can be suppressed. This can reduce the charge/discharge frequency of the battery and prolong the service life of the battery.

Assume that in a battery system forming a power supply system according to the present invention, all the plurality of dischargers connected in parallel with the load are in the discharge stop state. Even in this case, replacing one or more of batteries input to the respective dischargers and operating a manual switch provided for the corresponding discharger can resume power supply from the new battery, i.e., the input side of the discharger, to the control means of the discharger. This makes it possible to resume discharge operation to the load. After discharge operation is resumed, it is possible to supply power from the output sides of the dischargers to all the control means of the plurality of dischargers. Therefore, discharge operation to the load of the battery system can be easily started or resumed.

Furthermore, the present invention uses the switching element of the step-down means as an element which maintains the open state during a period in which no power is supplied to the control means. This can maintain the discharge stop state for the load when no power is supplied to the control means. This can therefore reliably prevent a situation in which the discharger becomes out of control and a battery voltage higher than the allowable voltage range of the load is output to the load side.

BRIEF DESCRIPTION OF DRAWINGS

FIG. 1 is a circuit diagram for explaining an example of the arrangement of a discharger according to an embodiment of the present invention;

FIG. 2 is a flowchart for explaining an example of the control operation of a control unit in the discharger according to the embodiment of the present invention;

BEST MODE FOR CARRYING OUT THE INVENTION

Figure 3:
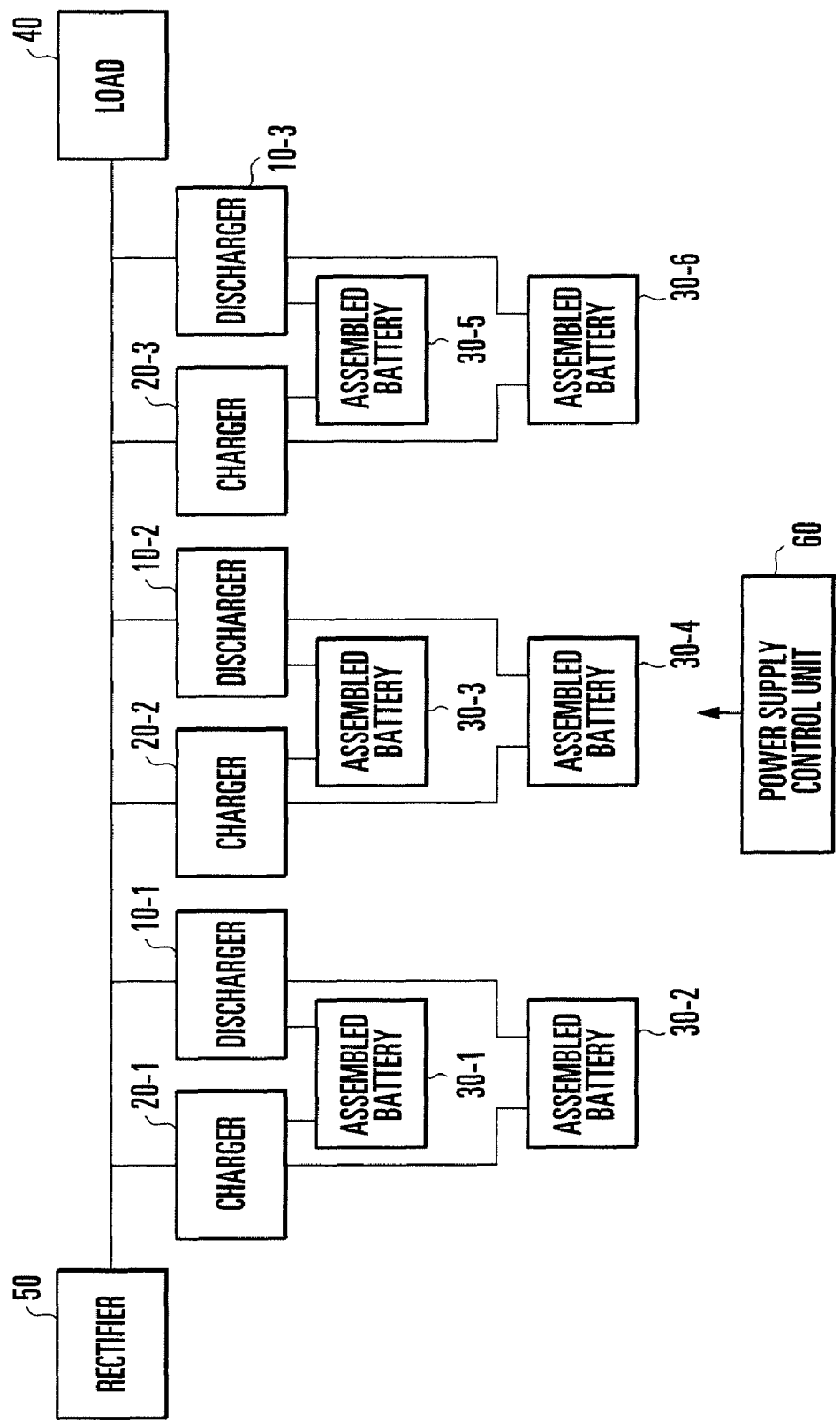
FIG. 3 is a view showing the arrangement of a battery system formed by using a plurality of assembled batteries and a plurality of dischargers.

An example of the best embodiment of a discharger and discharge control method according to the present invention will be described in detail below with reference to the accompanying drawings. The following description will exemplify a power supply system formed by a nickel metal hydride battery system (battery system) including a DC power supply constituted by a combination of a plurality of nickel metal hydride batteries. However, the present invention is not limited to this. For example, the present invention can be applied to a secondary battery system constituted by a combination of secondary batteries other than nickel metal hydride batteries, such as a plurality of lithium ion batteries, a battery system constituted by a combination of a plurality of batteries including primary batteries, or a power supply system constituted by a combination of a plurality of DC voltage sources including power storage capacitors.

Overview of Embodiment

An overview of this embodiment will be described first. This embodiment relates to the discharge operation of a discharger of a power supply system, and can be effectively applied to a large-capacity, long-life battery system using a nickel metal hydride battery system or the like, in particular. This embodiment is characterized in that discharge operation to a load can be stopped by opening a switching element mounted in a discharger as a step-down DC-DC converter as well as making the switching element perform switching operation at a proper switching frequency or short-circuiting the element so as to step down power supplied to the load.

That is, the discharger according to this embodiment can stop discharge operation to the load by setting the switching element in an open state when receiving an external signal which instructs to stop discharge or detecting that the input/output voltage of the discharger has exceeded a predetermined discharge operation condition range. This discharger can also restore the switching element to a switching operation state or a short-circuited state when detecting that an external signal is reset or that the input/output voltage of the discharger has satisfied a predetermined restoration condition for restoration from a disconnected state. This makes it possible for this embodiment to obtain the effect of effectively preventing overdischarge of a battery, erroneous output of an overvoltage to a load, and the like.

More specifically, the discharger according to this embodiment prevents consumption of a battery and erroneous output of an overvoltage to the load by stopping discharge operation to the load. By having a discharge disconnection function which allows starting discharge operation to the load, the discharger according to this embodiment can disconnect discharge operation or restore to discharge operation on the basis of a condition for a battery voltage input to the discharger, a condition for an output voltage output from the discharger, or an external signal which can externally instruct to stop or resume discharge operation. In this case, this embodiment uses the switching element of the step-down unit of the discharger not only as a constituent element of a step-down DC-DC converter but also as an element which implements the discharge disconnection function.

When the switching element of the step-down unit of the discharger is to be also used as an element which implements a discharge disconnection function, the step-up unit of the discharger is placed on the DC power supply (e.g., a battery constituted by a plurality of assembled batteries) side, with the step-down unit being placed on the load side, and the step-up unit and the step-down unit are connected in series so as to supply power output from the DC power supply to a load via the step-up unit and the step-down unit.

In such a circuit arrangement, the control unit of the discharger stops discharge operation to the load side by setting the switching element of the step-down unit in an open state on the basis of an input/output voltage condition for the discharger or an external signal. If a condition for restoration from the open state of the switching element holds, the control unit performs control to resume discharge operation to the load side by setting the switching element of the step-down unit in a switching operation state or a short-circuited state.

In addition, the discharger is configured to supply power from the output side of the discharger to the power supply of the control unit of the discharger in normal times and to supply power from the input side of the discharger, i.e., the DC power supply side, when a user presses a manual switch. If no power for the power supply of the control unit can be supplied, the switching element of the step-down unit is set in an open state to stop discharge operation to the load side.

With this arrangement, this embodiment need not supply unnecessary power from the DC power supply to the discharger. In addition, when power supply from the output side of the discharger to the control unit stops, the embodiment can resume the operation of the discharger by supplying power from the DC power supply on the input side of the discharger.

Arrangement of Embodiment

An example of the arrangement of the discharger according to this embodiment will be described next with reference to FIG. 1. FIG. 1 is a circuit diagram for explaining an example of the arrangement of the discharger according to this embodiment, and shows an example of a circuit arrangement having a step-up/step-down DC-DC converter function, a discharge operation disconnection function, and a restoration function.

Figure 4:
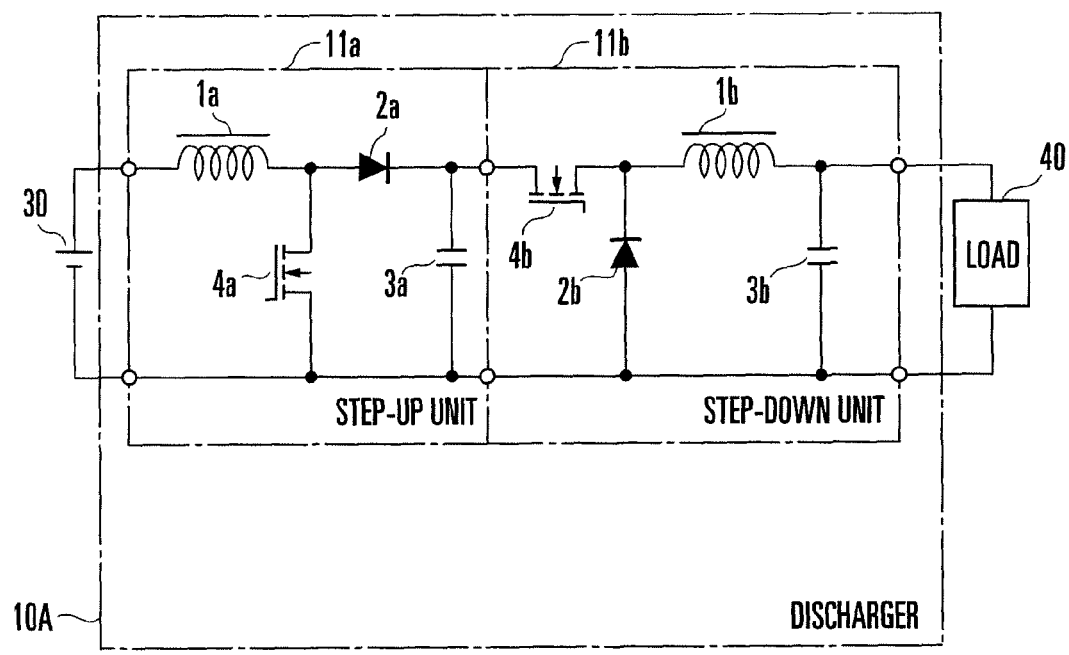
FIG. 4 is a circuit diagram showing an example of the circuit arrangement of a step-up/step-down DC-DC converter mounted in a conventional discharger.
Figure 5:
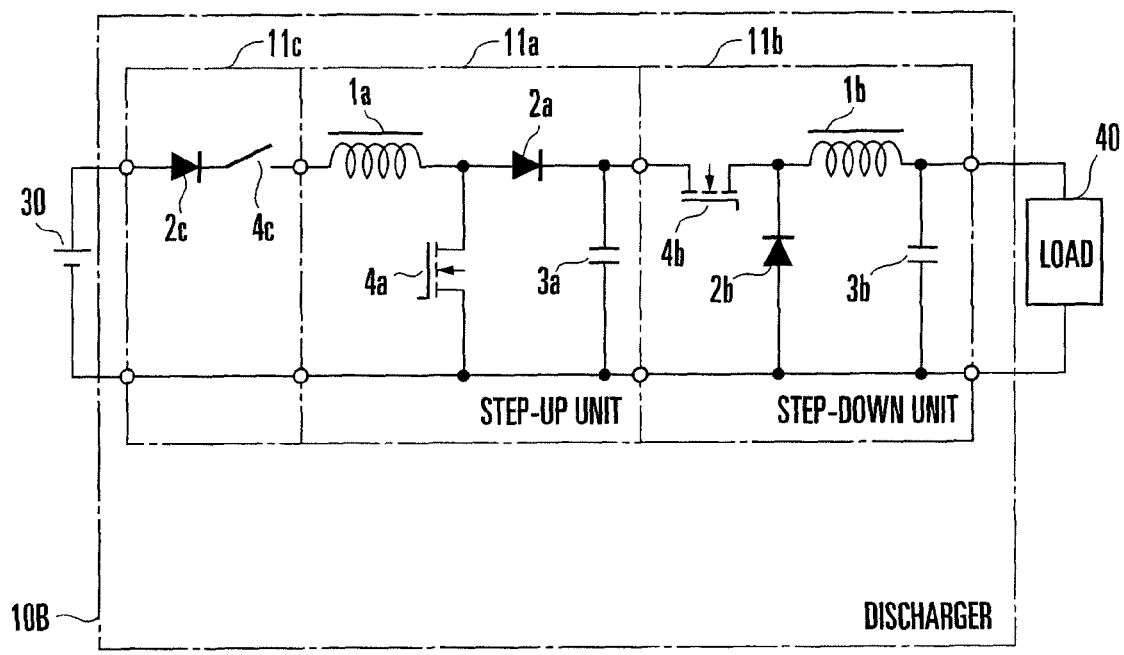
FIG. 5 is a circuit diagram showing an example of a circuit arrangement obtained by adding a disconnection unit to the step-up/step-down DC-DC converter mounted in the conventional discharger.

The overall arrangement of a battery system in this embodiment, which is formed by using assembled batteries 30, each constituted by a plurality of nickel metal hydride batteries, a plurality of dischargers 10, and a plurality of chargers 20, is the same as that shown in FIG. 3. As in the circuit arrangement of the discharger 10A shown in FIG. 4, each discharger 10 is configured to control an output voltage value and supply power to a load 40 via both a step-up unit 11a, which is a step-up means for outputting an input voltage from the assembled battery 30 as a DC power supply upon stepping up the voltage or without changing it, and a step-down unit 11b, which is a step-down means for outputting an input voltage from the assembled battery 30 upon stepping down the voltage or without changing it. The step-up unit 11a of the discharger 10 includes at least a reactor 1a, a diode 2a, a capacitor 3a, and a switching element 4a. The step-down unit 11b includes at least a reactor 1b, a diode 2b, a capacitor 3b, and a switching element 4b.

A control unit 12 as a control means for controlling the overall operation of the discharger 10 steps up or down an input voltage Vin from the assembled battery 30 to a desired voltage by making the switching elements 4, i.e., 4a and 4b, perform switching operation at a proper switching frequency, and outputs the resultant voltage as an output voltage Vout to the load 40. Alternatively, the control unit 12 outputs the input voltage Vin from the assembled battery 30 as the output voltage Vout to the load 40 without any change by opening the switching element 4a and short-circuiting the switching element 4b, or stops discharge operation to the load 40 by opening the switching element 4b.

In order to make the output voltage Vout to the load 40 fall within the operating voltage range of the load 40, the control unit 12 monitors output voltages from the step-up unit 11a and step-down unit 11b and controls the switching frequencies of the switching elements 4a and 4b so as not to make an output voltage from the step-up unit 11a fall below a predetermined set value V4 or not to make an output voltage from the step-down unit 11b exceed a predetermined set value V5.

The voltage output from the assembled battery 30 is applied to the load 40 after being stepped up or down by the step-up unit 11a or the step-down unit 11b, or is applied to the load 40 without any change by setting the switching element 4a of the step-up unit 11a in an open state and setting the switching element 4b of the step-down unit 11b in a short-circuited state. Alternatively, the application of the voltage to the load 40 is stopped by setting the switching element 4b of the step-down unit 11b in an open state.

The control unit 12 always monitors the input voltage Vin (the input voltage from the assembled battery 30) to the discharger 10 and the output voltage Vout (the output voltage to the load 40) from the discharger 10. If an input/output voltage condition set in advance for stopping discharge operation holds, the switching element 4b of the step-down unit 11b is set in an open state to stop discharge operation to the load 40 side. If an input/output voltage condition set in advance for resuming discharge operation holds thereafter, the control unit 12 resumes discharge operation to the load 40 side by setting the switching element 4b of the step-down unit 11b in a switching operation state or a short-circuited state.

The control unit 12 always monitors the input of an external signal from an external controller 70 which instructs to stop discharge operation to the load 40. Upon receiving the external signal, the control unit 12 stops discharge operation to the load 40 side by setting the switching element 4b of the step-down unit 11b in an open state. When detecting thereafter that the external signal is reset, the control unit 12 resumes discharge operation to the load 40 side by setting the switching element 4b of the step-down unit 11b in a switching operation state or a short-circuited state.

An external signal will be described below. The controller 70 which controls the overall system including the respective constituent elements is generally mounted in the battery system shown in FIG. 3. The controller 70 issues a charge start/end command to the charger 20 and a discharge permission/inhibition command to the discharger 10, detects the occurrence of a failure, and returns measurement data in response to a command from a host apparatus (not shown).

In the battery system in FIG. 3, if the discharger 10 detects a decrease in the input voltage Vin and stops discharge by itself before the controller 70 issues a command, the controller 70 outputs a warning, assuming that it has detected a failure in the discharger 10. In practical operation, therefore, for example, a set value V1 in the discharger 10 is set to 38 V, and a battery voltage at which the controller 70 stops discharge is set to 40 V so as to make the controller 70 always stop discharge first. That is, when the input voltage Vin becomes equal to or less than 40 V, the controller 70 outputs an external signal to the control unit 12. Discharge stop by the discharger 10 based on the set value V1 is a safeguard against a case in which the controller 70 cannot stop discharge.

Note that power for the control unit 12 is supplied from the output side of the discharger 10, i.e., the node between itself and the load 40, in normal times. When a manual switch 13 is pressed, this power can be supplied from the input side of the discharger 10, i.e., the assembled battery 30. The manual switch 13 is not limited to a type that is pressed to be closed in accordance with pressing operation, and may be any type, e.g., a type that is rotated.

This embodiment exemplifies the case in which the control unit 12 is implemented by hardware. However, the present invention is not limited to this. For example, the control unit 12 may be implemented by a computer which can execute a program (discharge control program) to control the discharge operation of the discharger 10 by executing the program. When the control unit 12 is to be implemented by a computer, it suffices to record a discharge control program for controlling the discharge operation of the discharger 10 in a recording medium such as a computer-readable ROM or a flash memory and make the computer perform operation.

Note that this embodiment exemplifies the case in which the discharger 10 includes both the step-up unit 11a and the step-down unit 11b as a step-up/step-down DC-DC converter of the discharger 10. However, if it suffices to form a discharger which provides only a step-down DC-DC converter function, the discharger may include only the step-down unit 11b.

In addition, the step-up unit 11a and the step-down unit 11b can further include, for example, voltage stabilization circuits for stabilizing output voltages.

Operation of Embodiment

An example of the control operation of the control unit 12 of the discharger 10 shown in FIG. 1 will be described next with reference to the flowchart of FIG. 2. The control method (discharge control method) for the discharge operation of the discharger 10 which is shown in FIG. 2 can be implemented by the execution of the discharge control program or by reading the discharge control program from a program recording medium as well as by hardware. As a program recording medium which records the discharge control program, a ROM or flash memory which can be incorporated in the control unit 12 or a ROM or flash memory which can be externally attached to the control unit 12 can be used. Alternatively, if the control unit 12 has a reading function for a portable recording medium such as a USB memory, memory card, FDD, CD, or DVD, the program may be recorded on such a portable recording medium.

Immediately after the start of control operation, based on the monitor result of the output voltage Vout from the step-down unit 11b, the control unit 12 of the discharger 10 maintains the output voltage Vout (i.e., the power supply voltage applied to the load 40) at a required voltage value equal to or less than a predetermined set value V5 by causing the switching element 4b of the step-down unit 11b to perform switching operation at a proper switching frequency or short-circuiting the switching element 4b (step S1 in FIG. 2).

Upon receiving an external signal which instructs to stop discharge operation from the controller 70 (YES in step S2), the control unit 12 sets the switching element 4b of the step-down unit 11b in an open state so as to stop discharge operation to the load 40 (step S3).

Thereafter, when the control unit 12 detects that an external signal which instructs to stop discharge operation has been reset (YES in step S4), the process returns to step S1 to restore the switching element 4b of the step-down unit 11b to the switching operation state or the short-circuited state so as to resume discharge operation to the load 40.

Upon detecting that the input voltage Vin to the discharger 10 has become equal to or less than a set value V1 (e.g., 40 V) set in advance for the prevention of overdischarge of the assembled battery 30 (YES in step S5) while not receiving the above external signal (NO in step S2), the control unit 12 sets the switching element 4b of the step-down unit 11b in an open state to stop discharge operation to the load 40 (step S6).

Subsequently, when the input voltage Vin to the discharger 10 is restored by replacing the assembled battery 30, and the control unit 12 detects that the input voltage Vin has become equal to or more than a set value V2 (e.g., 50 V) set in advance as a voltage value larger than the set value V1 (YES in step S7), the process returns to step S1 to restore the switching element 4b of the step-down unit 11b to the switching operating state or the short-circuited state so as to resume discharge operation to the load 40.

The set value V2 (e.g., 50 V) provided as a condition for restoration to discharge operation is set to be larger than the set value V1 (e.g., 40 V) as described above considering also the prevention of repetition of discharge stop and restoration due to the characteristic that the battery voltage of the assembled battery 30 naturally restores after discharge stop.

The range of the input voltages Vin to the discharger 10 (the battery voltages output from the assembled battery 30) is a predetermined voltage range, e.g., the voltage range of 40 V to 64 V. For this reason, the discharger 10 makes the output voltage Vout discharged to the load 40 fall within a desired operating voltage range in the allowable voltage range of the load 40 by outputting the input voltage Vin after stepping up or stepping down it or without changing it. If, however, for example, the reactor 1b is short-circuited due to a failure or the like in the discharger 10, the output voltage Vout from the discharger 10 sometimes abnormally rises. In some cases, this output voltage may become an overvoltage exceeding the allowable voltage range of the load 40 and cause a failure in the load equipment.

For this reason, upon detecting that the output voltage Vout from the discharger 10 has become equal to or more than a set value V3 (e.g., 53 V) set in advance for the prevention of output of an overvoltage to the load 40 (YES in step S8), the control unit 12 sets the switching element 4b of the step-down unit 11b in an open state to stop discharge to the load 40 (step S9). This protects the load equipment against overvoltages. Thereafter, it is necessary to execute a repair process for removing the cause of a failure or the like in the discharger 10 which has caused an overvoltage.

If the control unit 12 determines that the output voltage Vout from the discharger 10 is smaller than the set value V3 (e.g., 53 V) (NO in step S8), since this indicates a state in which the normal output voltage Vout is maintained, the process returns to step S2 to sequentially repeat the following operations: checking whether an external signal which instructs to stop discharge operation has been received (step S2), checking whether the input voltage Vin to the discharger 10 has become equal to or less than the set value V1 (step S5), and checking whether the output voltage Vout from the discharger 10 has become equal to or more than the set value V3 (step S8).

Note that the set value V3 (e.g., 53 V) provided for the prevention of output of an overvoltage is a value set to be equal to or less than the upper limit value of the allowable voltage range allowed by the load 40 in consideration of the safety of the load equipment. That is, the set value V3 is a value set on the basis of the allowable voltage range of the load 40, and is a value independent of the variation range of battery voltages output from the assembled battery 30. Depending on the number of nickel metal hydride batteries constituting the assembled battery 30 which are connected in series, power supply voltages fall within the variation range of 40 to 64 V. In some applications, therefore, the set value V3 can be a value smaller than the set value V1 (e.g., 40 V) indicating a voltage value for the prevention of overdischarge of the assembled battery 30, i.e., a value smaller than the lower limit value of battery voltages to be output from the normal assembled battery 30.

Assume that the switching element 4b of the step-down unit 11b is formed by using an FET (Field-Effect Transistor), and the gate terminal of the FET is connected to the control output terminal of the control unit 12 to control the gate potential of the FET in accordance with a voltage at the control output terminal. In this case, the FET can be turned on/off depending on the presence/absence of a voltage at the control output terminal, and hence the step-down operation of the step-down unit 11b can be controlled. In this case, when no power is supplied to the control unit 12, the gate potential of the FET forming the switching element 4b is set to zero, and hence the switching element 4b is automatically set in an open state. For this reason, when no power is supplied to the control unit 12, the switching element 4b is automatically opened to forcibly stop discharge operation to the load 40. This can prevent an abnormal overvoltage from being output from the discharger 10 to the load 40 even if the discharger 10 is set in an uncontrollable state due to the interruption of power supply to the control unit 12.

The power supply for the control unit 12 is wired such that power is supplied from the output side of the discharger 10. In the arrangement in which a plurality of dischargers 10 are connected in parallel with each other to perform discharge operation to the load 40 as shown in FIG. 3, even if the switching element 4b of the step-down unit 11b in the discharger 10 is opened, since power supply from another discharger 10 to the control unit 12 of the discharger 10 continues, the control unit 12 can continue control operation.

If, however, only one discharger 10 is used, when the switching element 4b of the step-down unit 11b is opened, power supply to the control unit 12 of the discharger 10 is simultaneously interrupted and disabled. Even in such a case, if an element like an FET as the switching element 4b is connected to the control output terminal of the control unit 12 as in the above arrangement, the open state of the switching element 4b of the step-down unit 11b can be maintained.

If the switching elements 4b of the step-down units 11b in all the dischargers 10 are opened in an application using a battery system like that shown in FIG. 3, in which the plurality of dischargers 10 are connected in parallel on the output side, since the output voltage Vout becomes zero, no power is supplied to the control units 12 of all the dischargers 10. As a consequence, no power is supplied to the control units 12 of all the dischargers 10, and the control units 12 of all the dischargers 10 stop control operation. Therefore, the operation of all the dischargers 10 completely stop operating.

In such a case, in order to activate the control unit 12 of the discharger 10 again, it is necessary, in, for example, a battery system like that shown in FIG. 3, to restore a commercial power supply in a failed state and make the rectifier 50 resume outputting. When the commercial power supply is restored to supply power from the rectifier 50 to the discharger 10, the control unit 12 of the discharger 10 is activated. This makes it possible to perform control operation for the discharger 10.

Assume that the operation of the control unit 12 of the discharger 10 is to be activated again by replacing the assembled battery 30 instead of restoring the commercial power supply which has been in the failed state. Pressing the manual switch 13 in FIG. 1 can make the discharger 10 resume discharge to the load 40 of the discharger 10. That is, while the manual switch 13 is pressed, a power supply line from the assembled battery 30 on the input side of the discharger 10 is formed for the control unit 12 as well as on the output side of the discharger 10. For this reason, the control unit 12 is activated by power from the assembled battery 30 which has replaced the old assembled battery to restore the switching element 4b of the step-down unit 11b to the switching operation state or the short-circuited state. This resumes discharge to the load 40.

In a battery system in which a plurality of dischargers 10 are connected in parallel on the output side as shown in FIG. 3, when a given discharger 10 resumes discharge operation to the load 40, power supply to the control units 12 of the other dischargers 10 connected in parallel is started via the output line of the discharger 10. If, therefore, the effective assembled battery 30 capable of outputting a normal battery voltage is connected to any one of the dischargers 10, since discharge to the load 40 is resumed, it suffices to press only the manual switch 13 of one discharger 10, of the plurality dischargers 10 connected in parallel, to which the effective assembled battery 30 is connected. The control unit 12 is based on the assumption that it can operate at all voltage values within the battery voltage variation range of the assembled battery 30 and the output voltage variation range of the discharger 10.

As described in detail above, a characteristic feature of the discharger 10 according to this embodiment is that the switching element 4b of the step-down unit 11b is used not only as a constituent element of the step-down DC-DC converter but also as an element which implements a disconnection function for discharge operation to the load 40.

For example, upon receiving an external signal which externally instructs to stop discharge operation, the control unit 12 of the discharger 10 opens the switching element 4b of the step-down unit 11b to stop discharge to the load 40. Thereafter, upon detecting that the external signal has been reset, the control unit 12 performs control to resume supply of power to the load 40 by restoring the switching element 4b of the step-down unit 11b to the switching operation state or the short-circuited state.

Furthermore, upon detecting that the input voltage Vin to the discharger 10 has become equal to or less than the set value V1 set in advance for the prevention of overdischarge of the assembled battery 30, the control unit 12 opens the switching element 4b of the step-down unit 11b to stop discharge to the load 40. Thereafter, upon detecting that the input voltage Vin to the discharger 10 has become equal to or more than the set value V2 set in advance as a value larger than the set value V1 due to replacement of the assembled battery 30 or the like, the control unit 12 performs control to resume supply of power to the load 40 by restoring the switching element 4b of the step-down unit 11b to the switching operation state or the short-circuited state.

Moreover, upon detecting that the output voltage Vout from the discharger 10 has become equal to or more than the set value V3 set in advance for the prevention of output of an overvoltage to the load 40, the control unit 12 performs control to stop discharge to the load 40 by opening the switching element 4b of the step-down unit 11b, in order to prevent an overvoltage from being applied to the load equipment.

In normal times during which the manual switch 13 is not pressed, power for the power supply for the control unit 12 is supplied from the output side of the discharger 10. In contrast to this, while the manual switch 13 is pressed, power can also be supplied from the input side of the discharger 10. In a state in which no power for the power supply for the control unit 12 can be supplied, the switching element 4b of the step-down unit 11b is maintained in the opened state.

Note that the above embodiment has exemplified the case in which the batteries constituting the assembled battery 30 are nickel metal hydride batteries. However, the present invention is not limited to this, as described above.

By having the above characteristics, this embodiment can prevent overdischarge of the assembled battery 30 by stopping discharge operation in accordance with the input/output voltage of the discharger 10. In addition, the embodiment can protect the load 40 against an overvoltage and can stop discharge in accordance with external control operation. In addition, the embodiment properly performs restoration from a discharge stop state (the disconnected state of the load 40).

This embodiment uses the switching element 4b of the step-down unit 11b not only as a constituent element of the step-down DC-DC converter but also as an element which implements a disconnection function for discharge operation to the load 40, and hence eliminates the necessity to additionally insert a new disconnection unit dedicated to a disconnection function in the power supply system. This embodiment is therefore free from increases in power loss and the amount of heat generated with increases in voltage drop as in a case in which a new disconnection unit is additionally inserted, and hence will not increase the installation space and the cost required to construct a battery system. In addition, it is not necessary to always supply power from the assembled battery 30 to the disconnection unit. This can also solve the conventional problem that the service life of the battery decreases due to continuous supply of power to the discharger 10.

In this embodiment, in a battery system in which a plurality of dischargers 10 are connected in parallel on the output side, even after discharge from all the dischargers 10 is stopped, resuming supply of power from a restored commercial power supply via a rectifier or replacing one of the plurality of assembled batteries 30 can start the battery system by operating the manual switch 13.

Effects of Embodiment of Present Invention

The effects obtained by the embodiment of the present invention will be described next in further detail.

First, in order to prevent overdischarge of a battery, protect load equipment against an overvoltage, and allow to externally stop discharge operation to the load, it is necessary for the discharger to include a means for properly stopping and restoring discharge operation to the load.

This embodiment is configured to also use the switching element 4b of the step-down unit 11b as an element which implements a disconnection function for discharge operation, and hence can prevent overdischarge of the assembled battery 30 by setting the switching element 4b in an open state under the control of the control unit 12 which is monitoring the input voltage Vin to the discharger 10. The embodiment can also protect load equipment against erroneous output of an overvoltage by setting the switching element 4b in an open state under the control of the control unit 12 which is monitoring the output voltage Vout from the discharger 10. In addition, the embodiment can externally control discharge stop by setting the switching element 4b in an open state under the control of the control unit 12 which is monitoring the reception of an external signal which externally instructs to stop discharge operation. Furthermore, the embodiment can properly resume discharge operation to the load 40, when a condition for restoration from the disconnected state of the load 40 holds, by restoring the switching element 4b to the switching operation state or the short-circuited state under the control of the control unit 12 which is monitoring such a restoration condition.

Second, in a discharger including a disconnection unit for disconnecting a load separately from a step-up/step-down DC-DC converter unit, a voltage drop occurs due to the additional insertion of a circuit element such as a diode forming the disconnection unit in a power supply line, resulting in an increase in power loss in the discharger and an accompanying increase in the amount of heat generated. It is therefore necessary to increase the size of the discharger and additionally install air conditioning equipment with an increase in the amount of heat generated. It is also necessary to increase the space and cost required to construct a battery system because of the necessity to install additional batteries to compensate for power loss in the discharger.

This embodiment is configured to also use the switching element 4b of the step-down unit 11b as an element which implements a disconnection function for discharge operation, and hence need not add any new separation unit and can suppress increases in power loss in the discharger 10 and the amount of heat generated. Along with this effect, the embodiment allows easy consideration of heat dissipation measures for the discharger 10 and can reduce the size of the discharger 10. In addition, suppressing an increase in the amount of heat generated can eliminate the necessity to additionally install air conditioning equipment. Furthermore, in the embodiment, since power output from the assembled battery 30 is efficiently supplied to the load 40, there is no need to add extra batteries. As a consequence, the embodiment can save a space and cost required to construct a battery system (power supply system).

Third, a discharger designed to supply operating power from a battery to a disconnection unit which disconnects a load has a mechanism of always supplying power from the battery to the disconnection unit, and hence the consumption of the battery is accelerated to increase the charge frequency of the battery and increase the charge/discharge cycle of the battery, resulting in the acceleration of deterioration of the battery.

This embodiment is configured to also use the switching element 4b of the step-down unit 11b as an element which implements a disconnection function for discharge operation, and hence operating power for the step-down unit 11b including the switching element 4b is supplied from the output side of the discharger 10 (i.e., the side from which output power is supplied to the load 40). This suppresses the consumption of the battery, and hence reduces the charge frequency of the battery. As a consequence, the service life of the battery can be prolonged.

Fourth, a discharger generally includes a control unit, which controls the switching operation of the switching element of a step-down unit. Assume that power to the control unit is interrupted. In this case, if the switching element of the step-down unit is set in a short-circuited state, an overvoltage which is not stepped down may be erroneously output to the load side. This may cause a problem in the load equipment.

In this embodiment, when no power is supplied to the control unit 12, since the switching element 4b of the step-down unit 11b is maintained in an open state, discharge to the load 40 is stopped. This makes it possible to maintain the load equipment in a safety state.

Fifth, in a case in which power is supplied from the output side of the discharger to the control unit of the discharger, when discharge is stopped, since power supply to the control unit is also interrupted, the discharger itself is left in an inoperable state, regardless of the effort to restore the discharge operation of the discharger, until discharge operation to the output side of the discharger is restored. This makes it absolutely necessary to supply power from, for example, a commercial power supply restored from a power failure state to a charger and a discharger via a rectifier.

This embodiment includes an electric circuit which supplies power from the assembled battery 30 on the input side of the discharger 10 to the control unit 12 as well as from the output side of the discharger 10 upon operation of the manual switch 13, and can activate discharge operation using power from the assembled battery 30. This makes it possible to activate the operation of the discharger 10 by operating the manual switch 13 after replacement of the assembled battery 30 and to provide a resumption means independently of the operation of resuming power supply from a commercial power supply.

INDUSTRIAL APPLICABILITY

The present invention can be applied to a discharger which controls an output from a DC power supply which is supplied to a load.

The invention claimed is:

1. A discharger comprising:
   step-down means including at least a switching element provided between a DC power supply and an output to a load;
   control means for controlling an output voltage to the load by controlling the switching element, and if a predetermined condition holds, stopping power output to the load by setting the switching element in an open state,
   wherein said control means includes means for i) determining that the predetermined condition holds, when detecting that an input voltage from the DC power supply has become not more than a predetermined first set value, and ii) resuming power output to the load by setting the switching element in one of a state of a switching element being activated into its switching operation to drop a voltage input thereto from a DC power supply to a desired voltage to be output to a load and a short-circuited state when detecting an input voltage from the DC power supply has become not less than a second set value larger than the first set value after the input voltage from the DC power supply has become not more than the first set value and the switching element has been set in an open state.

2. A discharger according to claim 1, wherein said control means includes means for determining that the predetermined condition holds, when receiving, from outside, an external signal which instructs to stop power output to the load.

3. A discharger according to claim 2, wherein said control means includes means for resuming power output to the load by setting the switching element in one of a state of a switching element being activated into its switching operation to drop a voltage input thereto from a DC power supply to a desired voltage to be output to a load and a short-circuited state, when detecting the external signal is reset after the switching element is set in an open state in accordance with the external signal.

4. A discharger comprising:
step-down means including at least a switching element provided between a DC power supply and an output to a load; and
control means for controlling an output voltage to the load by controlling the switching element, and if a predetermined condition holds, stopping power output to the load by setting the switching element in an open state,
wherein said control means includes means for determining that the predetermined condition holds, when detecting that an output voltage to the load has become not less than a predetermined first set value and means for determining that the predetermined condition holds, when receiving, from outside, an external signal which instructs to stop power output to the load; and
wherein said control means includes means for resuming power output to the load by setting the switching element in one of a state of a switching element being activated into its switching operation to drop a voltage input thereto from a DC power supply to a desired voltage to be output to a load and a short-circuited state, when detecting the external signal is reset after the switching element is set in an open state in accordance with the external signal.

5. A discharge control method comprising:
a discharging step controlling an output voltage to a load by controlling a switching element in step-down means including at least the switching element provided between a DC power supply and an output to the load;
an opening step stopping power output to the load by setting the switching element in an open state when a predetermined condition holds, wherein the opening step includes determining that the predetermined condition holds, when detecting that an input voltage from the DC power supply has become not more than a predetermined first set value, and resuming power output to the load by setting the switching element in one of a state of a switching element being activated into its switching operation to drop a voltage input thereto from a DC power supply to a desired voltage to be output to a load and a short-circuited state when detecting an input voltage from the DC power supply has become not less than a second set value larger than the first set value after the input voltage from the DC power supply has become not more than the first set value and the switching element has been set in an open state.

6. A discharge control method according to claim 5, wherein the opening step includes determining that the predetermined condition holds, when receiving, from outside, an external signal which instructs to stop power output to the load.

7. A discharge control method according to claim 6, further comprising resuming power output to the load by setting the switching element in one of a state of a switching element being activated into its switching operation to drop a voltage input thereto from a DC power supply to a desired voltage to be output to a load and a short-circuited state, when detecting the external signal is reset after the switching element is set in an open state in accordance with the external signal.

8. A discharge control method comprising:
a discharging step of controlling an output voltage to a load by controlling a switching element in step-down means including at least the switching element provided between a DC power supply and an output to the load; and
a opening step of stopping power output to the load by setting the switching element in an open state when a predetermined condition holds,
wherein the opening step includes the steps of:
determining that the predetermined condition holds, when detecting that an output voltage to the load has become not less than a predetermined first set value, and
determining that the predetermined condition holds, when receiving from outside, an external signal which instructs to stop power output to the load; and
further comprising resuming power output to the load by setting the switching element in one of a state of a switching element being activated into its switching operation to drop a voltage input thereto from a DC power supply to a desired voltage to be output to a load and a short-circuited state, when detecting the external signal is reset after the switching element is set in an open state in accordance with the external signal.

* * * * *